United States Patent
Ji

(10) Patent No.: US 10,798,088 B2
(45) Date of Patent: Oct. 6, 2020

(54) SERVICE OBJECT ALLOCATION

(71) Applicant: Alibaba Group Holding Limited, George Town (KY)

(72) Inventor: Jing Ji, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 198 days.

(21) Appl. No.: 16/040,310

(22) Filed: Jul. 19, 2018

(65) Prior Publication Data

US 2018/0351942 A1    Dec. 6, 2018

Related U.S. Application Data

(63) Continuation of application No. PCT/CN2017/071399, filed on Jan. 17, 2017.

(30) Foreign Application Priority Data

Jan. 26, 2016 (CN) .......................... 2016 1 0053629

(51) Int. Cl.
*H04L 29/06* (2006.01)
*H04L 29/08* (2006.01)
(Continued)

(52) U.S. Cl.
CPC .......... *H04L 63/0823* (2013.01); *G06F 21/33* (2013.01); *G06F 21/44* (2013.01);
(Continued)

(58) Field of Classification Search
CPC ..... H04L 67/20; H04L 67/38; H04L 63/0823; G06K 9/2054; G06K 9/2063;
(Continued)

(56) References Cited

U.S. PATENT DOCUMENTS

2001/0034635 A1* 10/2001 Winters ................ G06Q 30/02
                                                  705/14.33
2002/0028708 A1*  3/2002 Busch .................. G06Q 20/206
                                                  463/42
(Continued)

FOREIGN PATENT DOCUMENTS

CN      1910630      2/2007
CN    101244336      6/2010
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Christopher C Harris
(74) *Attorney, Agent, or Firm* — Fish & Richardson P.C.

(57) ABSTRACT

A request is received at a server and from a first software client to obtain at least one electronic credential, and the first software client is associated with a first user, and the server stores multiple electronic credentials that are used to extract a service object; at least one electronic credential is transmitted from the server to the first software client based on a predetermined rule; an allocation request is received at the server to extract the service object, and the allocation request includes electronic credentials selected from electronic credentials obtained by the first software client; a number of categories of the selected electronic credentials that included in the allocation request is determined to be is greater than or equal to a predetermined number; and the service object that selected from a service object set is allocated to the first software client based on a predetermined allocation rule.

20 Claims, 11 Drawing Sheets

(51) Int. Cl.

| | | |
|---|---|---|
| *G06F 21/44* | (2013.01) | |
| *G06Q 30/02* | (2012.01) | |
| *G06Q 20/32* | (2012.01) | |
| *H04W 12/06* | (2009.01) | |
| *G06Q 20/34* | (2012.01) | |
| *G06F 21/33* | (2013.01) | |
| *G06Q 20/06* | (2012.01) | |
| *H04L 12/58* | (2006.01) | |

(52) U.S. Cl.
CPC ..... *G06Q 20/0655* (2013.01); *G06Q 20/3223* (2013.01); *G06Q 20/351* (2013.01); *G06Q 30/02* (2013.01); *H04L 51/32* (2013.01); *H04L 67/125* (2013.01); *H04L 67/20* (2013.01); *H04L 67/22* (2013.01); *H04L 67/32* (2013.01); *H04L 67/42* (2013.01); *H04W 12/06* (2013.01)

(58) Field of Classification Search
CPC ....... G06F 3/0482; G06Q 20/10; G06T 11/60; G06T 2200/24; G06T 19/006
See application file for complete search history.

(56) References Cited

U.S. PATENT DOCUMENTS

| | | | | |
|---|---|---|---|---|
| 2012/0131086 | A1* | 5/2012 | Hoffman | G06Q 30/0209 709/202 |
| 2013/0185137 | A1 | 7/2013 | Shafi et al. | |
| 2014/0237578 | A1* | 8/2014 | Bryant | G06T 11/60 726/7 |
| 2016/0234302 | A1 | 8/2016 | Gong et al. | |
| 2016/0335684 | A1* | 11/2016 | You | G07F 17/3281 |
| 2020/0127999 | A1 | 4/2020 | Ji | |

FOREIGN PATENT DOCUMENTS

| | | |
|---|---|---|
| CN | 102419851 | 4/2012 |
| CN | 103973769 | 8/2014 |
| CN | 104054100 | 9/2014 |
| CN | 104268212 | 1/2015 |
| CN | 105100162 | 11/2015 |

OTHER PUBLICATIONS

Nakamoto, "Bitcoin: A Peer-to-Peer Electronic Cash System," www.bitcoin.org, 2005, 9 pages.

PCT International Preliminary Report on Patentability in International Application No. PCT/CN2017/071399, dated Jul. 31, 2018, 11 pages (with English translation).

qqtn.com [online], "QQ members step into the exciting multi-screen era event card redemption ipad," Jun. 2013, retrieved on Feb. 3, 2020, retrieved from URL<https://dwz.cn/9ALvTOM5?u=8b8b087283a975fe1>, 8 pages (with machine translation).

tgbus.com [online], "Cross Fire M4A1—Sakura Weapon Introducytion," Aug. 2014, retrieved on Feb. 3, 2020, retrieved from URL<http://cf.tgbus.com/qiang/288628_2.shtml>, 8 pages (with machine translation).

Editorial Department, "Haier's innovative thinking: comprehensive disruption makes extraordinary," Voice & Screen World, Aug. 2014, 8:162-163 (with English abstract).

Editorial Department, "Talk after the Cup: Who can really play the World Cup?," Voice & Screen World, Oct. 2014, 10:189-192 (with machine translation).

International Search Report by the International Searching Authority issued in International Application No. PCT/CN2017/071399 dated Mar. 30, 2017; 10 pages.

International Preliminary Report on Patentability in International Application No. PCT/CN2017/071399 dated Mar. 30, 2017; 11 pages.

* cited by examiner

SERVICE OBJECT ALLOCATION

CROSS-REFERENCE TO RELATED APPLICATIONS

This application is a continuation of PCT Application No. PCT/CN2017/071399, filed on Jan. 17, 2017, which claims priority to Chinese Patent Application No. 201610053629.1, filed on Jan. 26, 2016, and each application is hereby incorporated by reference in its entirety.

TECHNICAL FIELD

The present application relates to the field of service implementation technologies, and in particular, to service object allocation.

BACKGROUND

With development of network technologies, various service implementation methods emerge. Using the virtual goods exchange in a form of a "red envelope" as an example, a user can put an E-card, fund, etc. in a "red envelope", and then send the "red envelope" to another user, or send the "red envelope" to a group, so that all members in the group can receive the "red envelope".

SUMMARY

In view of this, the present application provides a service implementation method and device, so as to optimize service object allocation.

To achieve the previous objective, the present application provides the following technical solutions:

According to a first aspect of the present application, a service implementation method is provided, including: collecting, by a first user by using a first client software, an electronic credential used to extract a service object; determining, by the first client software, whether a category number of collected electronic credentials reaches a first number; and when the category number of collected electronic credentials reaches the first number, initiating an object allocation request including several electronic credentials whose category number is the first number to a server, so that the server allocates a service object to the first user from a service object set based on the object allocation request.

Optionally, the collecting an electronic credential used to extract a service object includes: obtaining an electronic credential delivered by the server to the first client software; and obtaining an electronic credential shared by a second user by using a second client software.

Optionally, the first client software provides a trigger option used to obtain an electronic credential; and the obtaining an electronic credential delivered by the server to the first client software includes: when a trigger operation of the first user on the trigger option is detected, initiating a request for collecting the electronic credential to the server, so that the server delivers the electronic credential to the first client software based on a predetermined delivery rule; and obtaining the electronic credential delivered by the server to the first client software based on the predetermined delivery rule, where a category number of electronic credentials delivered by the server to the first client software is smaller than the first number.

Optionally, the method further includes: generating a corresponding display picture for the electronic credential when the electronic credential is collected; and adding the generated display picture to a display location corresponding to the electronic credential, where display pictures generated for different categories of electronic credentials are different from each other, and display locations corresponding to different categories of electronic credentials are different from each other.

Optionally, the method further includes: marking the number of obtained electronic credentials at the display location; and updating the number based on an actual number of remaining electronic credentials.

Optionally, the method further includes: when a predetermined trigger operation of the first user on any display picture is detected, sharing an electronic credential corresponding to the display picture with a target user selected by the first user.

Optionally, the method further includes: when the server has allocated the service object to the first user, receiving an allocation result sent by the server, and displaying the allocation result to the first user, where the allocation result includes one or more of the following information: the number of service objects, a sender of the service object, the number of other receivers of the service object, and an allocation rule of the service object.

According to a second aspect of the present application, a service implementation method is provided, including: receiving an object allocation request sent by a first user by using a first client software, where the object allocation request includes several electronic credentials used to extract a service object; determining whether a category number of electronic credentials included in the object allocation request reaches a first number; and when the category number of electronic credentials included in the object allocation request reaches the first number, allocating a service object to the first user from a service object set based on a predetermined allocation rule.

Optionally, the method further includes: when a request sent by the first client software to obtain the electronic credential is received, delivering the electronic credential to the first client software from locally stored electronic credentials based on a predetermined delivery rule, where a category number of electronic credentials delivered to the first client software is smaller than the first number.

Optionally, the delivery of the electronic credential to the first client software based on a predetermined delivery rule includes: randomly delivering the electronic credential to the first client software from the locally stored electronic credentials.

Optionally, the locally stored electronic credentials are pre-divided into at least a low-frequency delivery set and a high-frequency delivery set; and the delivery of the electronic credential to the first client software based on a predetermined delivery rule includes: calculating activeness of the first user; determining whether the activeness reaches a predetermined threshold; and when the activeness reaches the predetermined threshold, delivering the electronic credential to the first client software from the low-frequency delivery set; or delivering electronic credentials to the first client software from the low-frequency delivery set and the high-frequency delivery set, where the delivered electronic credentials include at least one electronic credential in the low-frequency delivery set.

Optionally, the method further includes: when the service object has been allocated to the first user, sending an allocation result to the first client software, so that the first client software displays the allocation result to the first user, where the allocation result includes one or more of the following information: the number of service objects, a sender of the service object, the number of other receivers of the service object, and an allocation rule of the service object.

According to a third aspect of the present application, a service implementation device is provided, including: an acquisition module, configured to obtain an electronic credential used to extract a service object; a first determining module, configured to determine whether a category number of obtained electronic credentials reaches a first number; and an initiation module, configured to: when the category number of obtained electronic credentials reaches the first number, initiate an object allocation request including several electronic credentials whose category number is the first number to a server, so that the server allocates a service object to a first user from a service object set based on the object allocation request.

Optionally, the acquisition module is configured to: obtain an electronic credential delivered by the server to the first client software; and obtain an electronic credential shared by a second user by using a second client software.

Optionally, the first client software provides a trigger option used to obtain an electronic credential; and the acquisition module is further configured to: when a trigger operation of the first user on the trigger option is detected, initiate a request for collecting the electronic credential to the server, so that the server delivers the electronic credential to the first client software based on a predetermined delivery rule; and obtain the electronic credential delivered by the server to the first client software based on the predetermined delivery rule, where a category number of electronic credentials delivered by the server to the first client software is smaller than the first number.

Optionally, the device further includes: a generation module, configured to generate a corresponding display picture for the electronic credential when the electronic credential is obtained; and a display module, configured to add the generated display picture to a display location corresponding to the electronic credential, where display pictures generated for different categories of electronic credentials are different from each other, and display locations corresponding to different categories of electronic credentials are different from each other.

Optionally, the generation module is further configured to: mark the number of obtained electronic credentials at the display location; and update the number based on an actual number of remaining electronic credentials.

Optionally, the device further includes: a sharing module, configured to: when a predetermined trigger operation of the first user on a display picture added to any display location is detected, share an electronic credential corresponding to the display picture with a target user selected by the first user.

Optionally, the device further includes: a first receiving module, configured to: when the server has allocated the service object to the first user, receive an allocation result sent by the server, and display the allocation result to the first user, where the allocation result includes one or more of the following information: the number of service objects, a sender of the service object, the number of other receivers of the service object, and an allocation rule of the service object.

According to a fourth aspect of the present application, a service implementation device is provided, including: a second receiving module, configured to receive an object allocation request sent by a first user by using a first client software, where the object allocation request includes several electronic credentials used to extract a service object; a second determining module, configured to determine whether a category number of electronic credentials included in the object allocation request reaches a first number; and an allocation module, configured to: when the category number of electronic credentials included in the object allocation request reaches the first number, allocate a service object to the first user from a service object set based on a predetermined allocation rule.

Optionally, the device further includes: a delivery module, configured to: when a request sent by the first client software to obtain the electronic credential is received, deliver the electronic credential to the first client software from locally stored electronic credentials based on a predetermined delivery rule, where a category number of electronic credentials delivered to the first client software is smaller than the first number.

Optionally, the delivery module is configured to: randomly deliver the electronic credential to the first client software from the locally stored electronic credentials.

Optionally, the locally stored electronic credentials are pre-divided into at least a low-frequency delivery set and a high-frequency delivery set; and the delivery module is configured to: calculate activeness of the first user; determine whether the activeness reaches a predetermined threshold; and when the activeness reaches the predetermined threshold, deliver the electronic credential to the first client software from the low-frequency delivery set; or deliver electronic credentials to the first client software from the low-frequency delivery set and the high-frequency delivery set, where the delivered electronic credentials include at least one electronic credential in the low-frequency delivery set.

Optionally, the device further includes: a sending module, configured to: when the service object has been allocated to the first user, send an allocation result to the first client software, so that the first client software displays the allocation result to the first user, where the allocation result includes one or more of the following information: the number of service objects, a sender of the service object, the number of other receivers of the service object, and an allocation rule of the service object.

It can be seen from the previous technical solutions that in the present application, during allocation of the service object to the first user, the first user can obtain, by using the first client software, the electronic credential used to extract the service object. When the category number of obtained electronic credentials reaches the first number, the first user can obtain service object allocation permission, and initiate the object allocation request to the server by using the first client software, so that the server allocates the service object to the first user. Therefore, service allocation becomes more interesting, and user application experience is improved.

DESCRIPTION OF EMBODIMENTS

Figure 1:
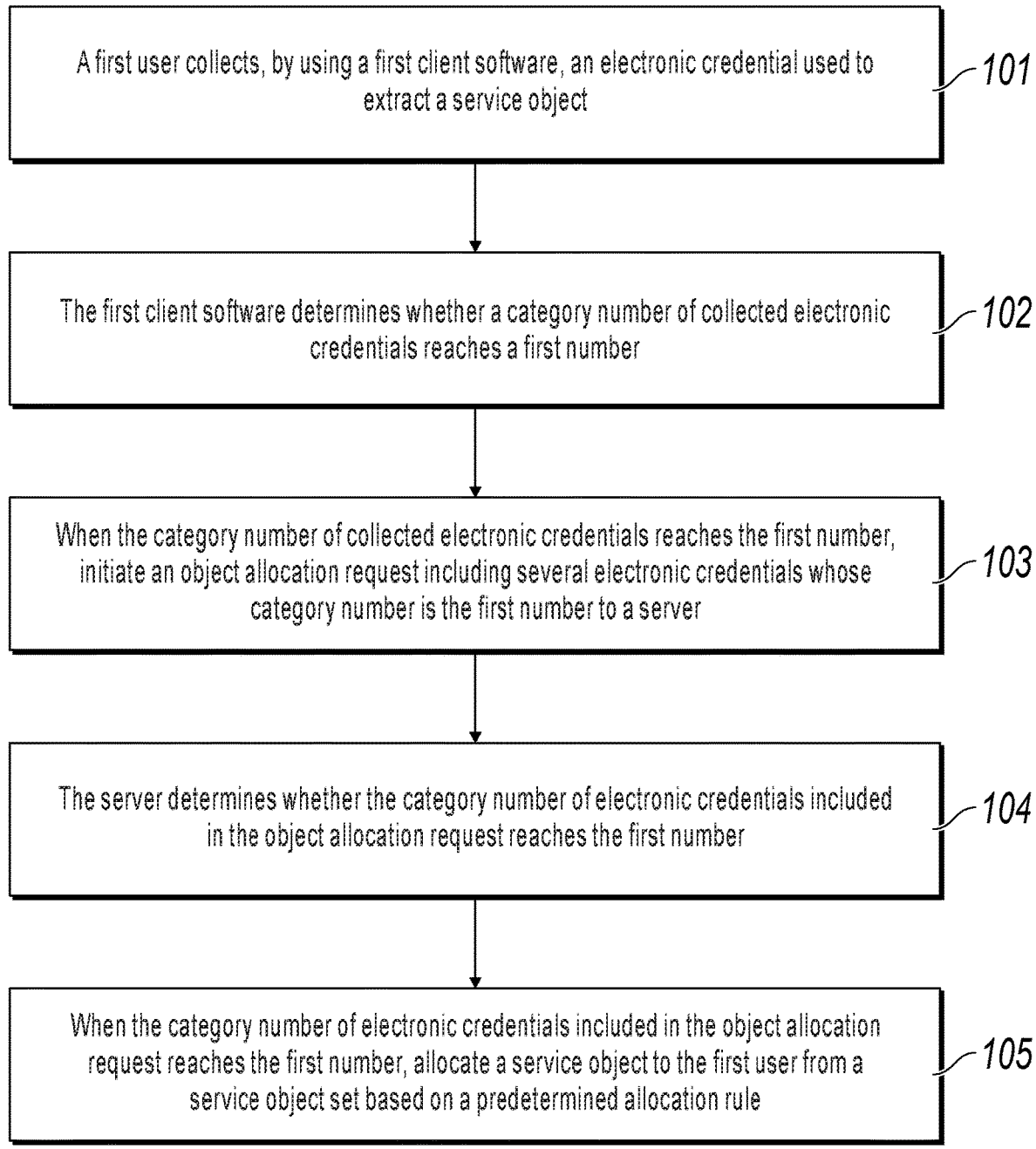
FIG. 1 is a flowchart illustrating a service implementation method, according to an example implementation of the present application.

FIG. 1 is a flowchart illustrating a service implementation method, according to an example implementation of the present application. As shown in FIG. 1, the method is applied to a client software and a server. The client software and the server can cooperate with each other to perform the following steps:

Step 101: A first user collects, by using a first client software, an electronic credential used to extract a service object.

Step 102: The first client software determines whether a category number of collected electronic credentials reaches a first number.

Step 103: When the category number of collected electronic credentials reaches the first number, initiate an object allocation request including several electronic credentials whose category number is the first number to the server.

Step 104: The server determines whether the category number of electronic credentials included in the object allocation request reaches the first number.

Step 105: When the category number of electronic credentials included in the object allocation request reaches the first number, allocate a service object to the first user from a service object set based on a predetermined allocation rule.

The client software can include an application program installed on an electronic device. For example, in a "red envelope" sending application scenario, the client software can include client software installed on the electronic device to provide a red envelope sending function, for example, Alipay. The client software can be different client software in different scenarios.

The server can include a server, a server cluster, or a cloud platform that serves the client software. For example, when the client software is an Alipay client software, the server can be an Alipay service platform.

The service object can be service interaction data in any form. In an example implementation, the service object can include virtual goods, for example, a coupon, an E-card, or a fund. The virtual goods can include different content in different services. For example, the service object can be money in a payment service; or the service object can be a coupon in a commodity activity service initiated by a merchant. The service object set is a set of service objects that can be extracted by the first user. For example, when the service object is money sent in a red envelope form, the service object set can be a red envelope sending account of a third-party enterprise that cooperates with a red envelope sending platform.

The first user can be an extraction party of the service object. The first client software can be a client software used when the first user extracts the service object. For example, when the client software is installed on any electronic device, after the first user logs into the client software by using a registration account, the first user can interact with the server to extract the service object by using the client software.

The electronic credential is a credential used when the first user extracts the service object from the server. In actual applications, a specific form of the electronic credential is not limited. The electronic credential can be a character string, a digit, a character, a password, a virtual card, etc. The server can perform verification on content, a number, or a category of the electronic credential submitted by the first user to determine whether the first user has service object extraction permission, and allocate the service object to the first user from the service object set when the first user has the extraction permission. Each electronic credential can have a corresponding category or type. Each category of electronic credentials can represent one type of credential, and each type of credential can have the same or different content.

In this example, the first user can collect the electronic credential by using the first client software, and obtain service object allocation permission when the category number of collected electronic credentials reaches the first number. The category number is the number of types of electronic credentials collected by the user. A specific value of the first number is not limited in the present application, and can be determined as needed in actual applications.

For example, the service object can be money sent in the red envelope form, the electronic credential can be a virtual card, and the first number can be 5. When the first user has collected five different types of virtual cards, the first user can obtain red envelope receiving permission.

In this example, the first user can collect the electronic credential in the following methods:

Collection method 1: Obtain an electronic credential delivered by the server.

In this example, the first user can obtain, by using the first client software, the electronic credential delivered by the server.

In an implementation, the first client software can provide a trigger option used by the user to obtain the electronic credential. The user can obtain the electronic credential from the server by triggering the trigger option. For example, the trigger option can be a trigger button, an activity entrance, etc. provided by the first client software for the user. The user can trigger the trigger option through a trigger operation such as tap, double tap, or touch and hold, so as to obtain the electronic credential from the server.

When the first client software detects the trigger operation of the user on the trigger option in the background, the first client software can initiate a request for collecting the electronic credential to the server. After receiving the request, the server can deliver the electronic credential to the first client software from locally stored electronic credentials based on a predetermined delivery rule.

When delivering the electronic credential to the first client software, the server can directly deliver the electronic credential to the first client software, or can deliver only a unique identifier corresponding to the electronic credential to the first client software, and locally store a mapping relationship between the unique identifier and the electronic credential. The unique identifier can be subsequently used to identify the corresponding electronic credential. Assume that the electronic credential is a character string. The server can directly deliver the character string used as the electronic credential to the first client software, or can generate a unique corresponding identifier for the character string, and deliver the identifier to the first client software. A specific delivery form is not limited in this implementation.

In a specific implementation, to prevent the electronic credential from being counterfeited, when the server generates the electronic credential for the user, the server can encrypt the electronic credential by using a predetermined encryption algorithm. For example, the electronic credential is a character string. When generating the electronic credential, the server can encrypt a generated character string by using the predetermined encryption algorithm, and then send the encrypted character string to the user. When performing verification on a character string sent by the user, the server can decrypt the received character string by using a key, and then perform verification on the decrypted character string. As such, the electronic credential can be prevented from being counterfeited by the user.

In this example, a category number of electronic credentials delivered by the server to the first client software can be smaller than the first number, in other words, the number of types of electronic credentials delivered by the server to the first client software is smaller than the first number. For example, the electronic credential is a virtual card. Assume that the user needs to collect five different types of virtual cards to obtain the service object allocation permission. When the server actively delivers the virtual card to the user, the server can deliver less than five categories, for example, three categories of virtual cards. As such, the number of users who have the service object allocation permission can be effectively controlled.

Certainly, when the server delivers the electronic credential to the first client software, not only can the first user actively obtain the electronic credential from the server by triggering the trigger option provided by the first client software, but the server can also actively deliver the electronic credential. For example, in an implementation, after the first user successfully logs into the first client software by using the registration account, the server can actively deliver the electronic credential to the first client software.

In addition, it is worthwhile to note that the delivery rule used when the server delivers the electronic credential to the first client software can be set based on an actual service requirement.

In an implementation, the delivery rule can include random delivery.

In this case, after receiving the request initiated by the first client software to obtain the electronic credential, the server can randomly deliver the electronic credential to the first client software from the locally stored electronic credentials.

In another implementation, the delivery rule can include selective delivery to a specific group.

In this case, the server can pre-divide the locally stored electronic credentials into a low-frequency delivery set and a high-frequency delivery set. An electronic credential in the low-frequency delivery set can be delivered to a specific user designated by the server, and an electronic credential in the high-frequency delivery set can be delivered to a common user.

In an implementation, the specific user can be an active user. When delivering the electronic credential, the server can preferentially deliver the electronic credential in the low-frequency delivery set to the active user, and can preferentially deliver the electronic credential in the high-frequency delivery set to the common user.

In this case, when delivering the electronic credential to the first user, the server can locally calculate activeness of the first user, and then compare the calculated activeness and a predetermined threshold, to determine whether the first user is an active user. If the activeness of the first user reaches the predetermined threshold, the server can determine that the first user is an active user. In this case, the server can read the credential from the low-frequency delivery set and then deliver the credential to the first user.

For example, in an implementation, when determining that the first user is an active user, the server can read the electronic credential only from the low-frequency delivery set, and deliver the electronic credential to the first user. In another implementation, when determining that first users are an active group, the server can read electronic credentials from both the low-frequency delivery set and the high-frequency delivery set, and deliver the electronic credentials to the first users. However, in this case, the delivered electronic credentials need to include at least one electronic credential in the low-frequency delivery set. The server can deliver the electronic credential to an inactive common user only from the high-frequency delivery set.

As such, the active user can obtain a relatively "rare" electronic credential more easily, so that the active user can more easily obtain service object acquisition permission.

It is worthwhile to note that when the server calculates the activeness of the first user, the activeness can be represented by a daily parameter of the first user that is related to the user's daily activeness. For example, in actual applications, the more friends a user has or more service she initiates, the more active she is. Therefore, the parameter can include parameters such as the number of friends or initiated services of the user. When calculating the activeness of the first user, the server can count the number of friends of the first user, or count the number of services initiated by the first user, and then perform threshold processing (i.e., compare the number with a threshold) to determine whether the user is an active user.

Certainly, in actual applications, the parameter representing the user activeness is not limited to the number of friends or the number of initiated services. In some implementations, the user activeness can be calculated by using another parameter representing the user activeness.

Collection method 2: Collect an electronic credential shared by another user.

In this example, the first user can obtain, by using the first client software, an electronic credential shared by a second user by using a second client software. The second user can be another user relative to the first user. The second client software can be the same as the first client software. When the second user shares the electronic credential with the first user by using the second client software, the second user can share the electronic credential within the client software, or can forward the electronic credential to a third-party client software, and then share the electronic credential with the first user.

For example, in an implementation, the electronic credential is a virtual card, both the first client software and the second client software can be an Alipay client software, and both the first client software and the second client software can provide a sharing interface. The second user can share the virtual card with the first user within an Alipay client software of the second user, or can share the virtual card on a third-party social platform or instant messaging software in a form of a link or a clickable picture by using a sharing interface provided by an Alipay client software. After receiving the virtual card shared by the second user, the first user can click the link or the picture to jump to an interface of the Alipay client software, and collect the virtual card shared by the second user.

In this example, when collecting the electronic credential by using the previous two collection methods, the first client software can generate a corresponding display picture for the electronic credential, and display the display picture to the user in a user interface.

A collection option can be provided in the display picture. For example, when the electronic credential is a virtual card, the collection option can be a trigger option of "Collect the card". After the first user triggers the trigger option through a trigger operation such as a tap, the first client software can add the generated display picture to a display location provided in a user interface of the first client software, so as to visually display the currently obtained electronic credential to the first user.

The display picture generated by the first client software for the electronic credential can correspond to a type of the electronic credential. In other words, display pictures corresponding to different types of electronic credentials are different from each other. Content displayed in the display picture is not limited. In addition, the display location provided by the first client software in the user interface can also correspond to the type of the electronic credential, and different display locations can correspond to different types of electronic credentials.

In addition, after adding the generated display picture to the corresponding display location, the first client software can further mark the number of currently obtained electronic credentials corresponding to the display location at the display location. For example, the first client software can generate a digital notification in an upper right corner of the display location. In addition, after the number of types of electronic credentials changes, the first client software can further update the number marked at a display location corresponding to the electronic credentials based on a current actual number of remaining electronic credentials.

In this example, the obtained electronic credential can be further shared by the first user with another user.

In an implementation, the first user can trigger a display picture added to a display location, to share an electronic credential corresponding to the display picture with another user.

For example, when the first user wants to share a type of electronic credential, the first user can trigger a display location corresponding to the electronic credential through a trigger operation such as a tap. After the display location is triggered, a display picture corresponding to the display location can be displayed in the user interface.

In this case, a sharing option can be provided in the display picture. For example, when the electronic credential is a virtual card, the sharing option can be a trigger option of "Send one to a friend". After the first user triggers the trigger option through a predetermined trigger operation such as a tap, the first client software can output a sharing method selection interface, and can provide several sharing methods that can be selected by the first user in the selection interface. In this case, the user can select a sharing method in the selection interface, and then select a target user who the user wants to share the electronic credential with this time. After the user has selected the sharing method, the first client software can send the electronic credential to the target user selected by the first user.

When the first user shares the electronic credential with the target user, if the target user is a contact or a friend of the first user on the first client software, the first user can share the electronic credential with the target user within the first client software. In this case, the first client software can transmit the electronic credential that needs to be shared to a client software of the target user by using the server. For example, in one method, the first client software can send the electronic credential that needs to be shared to the server, and then the server forwards the electronic credential to the client software of the target user. In another method, the first user can send a notification message to the server, to notify the server of an ID of the electronic credential that needs to be shared, and the server redelivers the corresponding electronic credential to the target user.

Certainly, if the target user is not a contact or a friend of the first user on the first client software, but a contact or a friend of the first user on a third-party client software, the first user can share the electronic credential with the target user by using the third-party client software.

In this case, the first client software can generate a corresponding access link for the electronic credential that needs to be shared by using the server, and then share the generated access link with the target user by using the third-party client software. For example, the first client software is an Alipay client software, and the third-party client software is a third-party social platform or instant messaging software. The Alipay client software can generate a corresponding access link or a clickable picture for the electronic credential that needs to be shared by using the server, and then share the electronic credential with the third-party social platform or the instant messaging software in the form of a link or a picture. After receiving the electronic credential shared by the first user, the target user can click the link or the picture, to access the electronic credential on the server and then jump to an interface of the Alipay client software to collect the electronic credential. In this example, after the first user collects the electronic credential by using the previous two collection methods, the first client software can determine whether the number of types of currently collected electronic credentials reaches the first number in the background in real time. If the number of types reaches the first number, the first user can obtain the service object allocation permission. In this case, the first client software can initiate the object allocation request to the server, and add several electronic credentials to the object allocation request.

In an implementation, both the number and the category number of electronic credentials included in the object allocation request can be the first number. Therefore, after receiving the object allocation request, the server can obtain the electronic credential included in the object allocation request, and then perform verification.

It is worthwhile to note that an operation of initiating the object allocation request by the first client software to the server can be manually triggered by the user, or can be automatically triggered when the first client software determines that the category number of collected electronic credentials reaches the first number.

For example, in one case, when the first client software determines that the number of collected electronic credentials reaches the first number in the background, the first client software can automatically initiate the object allocation request to the server. In another case, a trigger button (the trigger button can also be a display location) for triggering the first client software to initiate the object allocation request to the server can be provided at a display location corresponding to each electronic credential. When the first client software determines that the number of collected electronic credentials reaches the first number in the background, the first client software can output a notification to the user by using the trigger button, to notify the user that the user can obtain the service object allocation permission currently. Then the first client software can initiate the service allocation request to the server based on a trigger operation of the user on the trigger button.

In this example, after the server verifies the electronic credentials included in the object allocation request, if the server determines that the category number of electronic credentials included in the object allocation request reaches the first number, the server can grant the service object allocation permission to the first user, and immediately allocate the service object to the first user from the corresponding service object set based on the predetermined allocation rule, or after an allocation time specified to allocate the service object arrives, the server allocates the service object to the first user from the corresponding service object set based on the predetermined allocation rule.

The allocation rule can also be set based on an actual service requirement.

In an implementation, the server can count the number of all users who are granted the object allocation permission, and calculate an average allocation number of service objects in the service object set based on the counted number of users. In this case, the calculated average allocation number is the number of service objects that need to be allocated to each user. In this case, the server can allocate a service object to each user from the service object set based on the calculated average allocation number.

For example, in a red envelope sending service, the server can count the number of all users who have red envelope receiving permission, obtain an average by dividing a total number of red envelopes that can be sent by the number of users who have the red envelope receiving permission, and then send a red envelope with a corresponding amount to each user based on the average.

In another implementation, when allocating the service object to the first user, the server can randomly extract a certain number of service objects from the service object set for the first user. For example, the server can calculate a random number for the first user based on a predetermined random algorithm with reference to a total number of service objects in the service object set, and then allocate the service object to the user based on the random number.

Certainly, in addition to the previous allocation rules, another allocation rule can be used in actual applications. The rules are not listed one by one in the present application.

In this example, after having allocated the service object to the first user, the server can further send an allocation result to the first client software of the first user. After receiving the allocation result, the first client software can display the allocation result to the user.

The allocation result can include one or more of the following information: the number of allocated service objects, a sender of the service object, another receiver of the service object, the number of other receivers, an allocation rule of the service object, etc. For example, in a red envelope sending service, after the server sends a red envelope to the first user, information displayed to the first user in the allocation result can include information such as a red envelope amount, a sender of the red envelope, another receiver of the red envelope, the number of other receivers, and an allocation rule of the red envelope.

It can be seen that in the previous implementations, during allocation of the service object to the first user, the first user can obtain, by using the first client software, the electronic credential used to extract the service object. When the category number of obtained electronic credentials reaches the first number, the first user can obtain the service object allocation permission, and initiate the object allocation request to the server by using the first client software, so that the server allocates the service object to the first user. Therefore, service allocation becomes more interesting, and user application experience is improved.

The following describes in detail the technical solutions in the previous implementations with reference to a specific application scenario.

In the present application, different services can be implemented between different users by using the technical solutions shown in FIG. 1. For example, the service can be a red envelope sending service.

An example of when the red envelope sending service is used, is described below with reference to a specific application scenario.

In an application scenario, the service can be an enterprise that cooperates with the red envelope sending platform that sends a red envelope to the user.

In the present application scenario, the client software can be a payment client software of the user that has a red envelope function, for example, Alipay. The server can be a payment platform with a red envelope sending function, for example, an Alipay platform. The service object can include money sent in a red envelope form. The service object set can be an enterprise capital account of an enterprise that cooperates with the payment platform, and money in the enterprise capital account is a total amount of money of the enterprise that can be used to send a red envelope to the user. The electronic credential can be a virtual card used by the red envelope sending platform to determine whether the user has the red envelope receiving permission.

In a red envelope sending service "luck bonus", electronic credentials that can be delivered to the user on the red envelope platform can include five types of virtual cards: "Health card", "Friendliness card", "Prosperity card", "Harmony card", and "Wealth card". After collecting the five types of virtual cards, the user obtains permission to receive a "lucky card" red envelope sent by the enterprise that cooperates with the payment platform.

Figure 2:
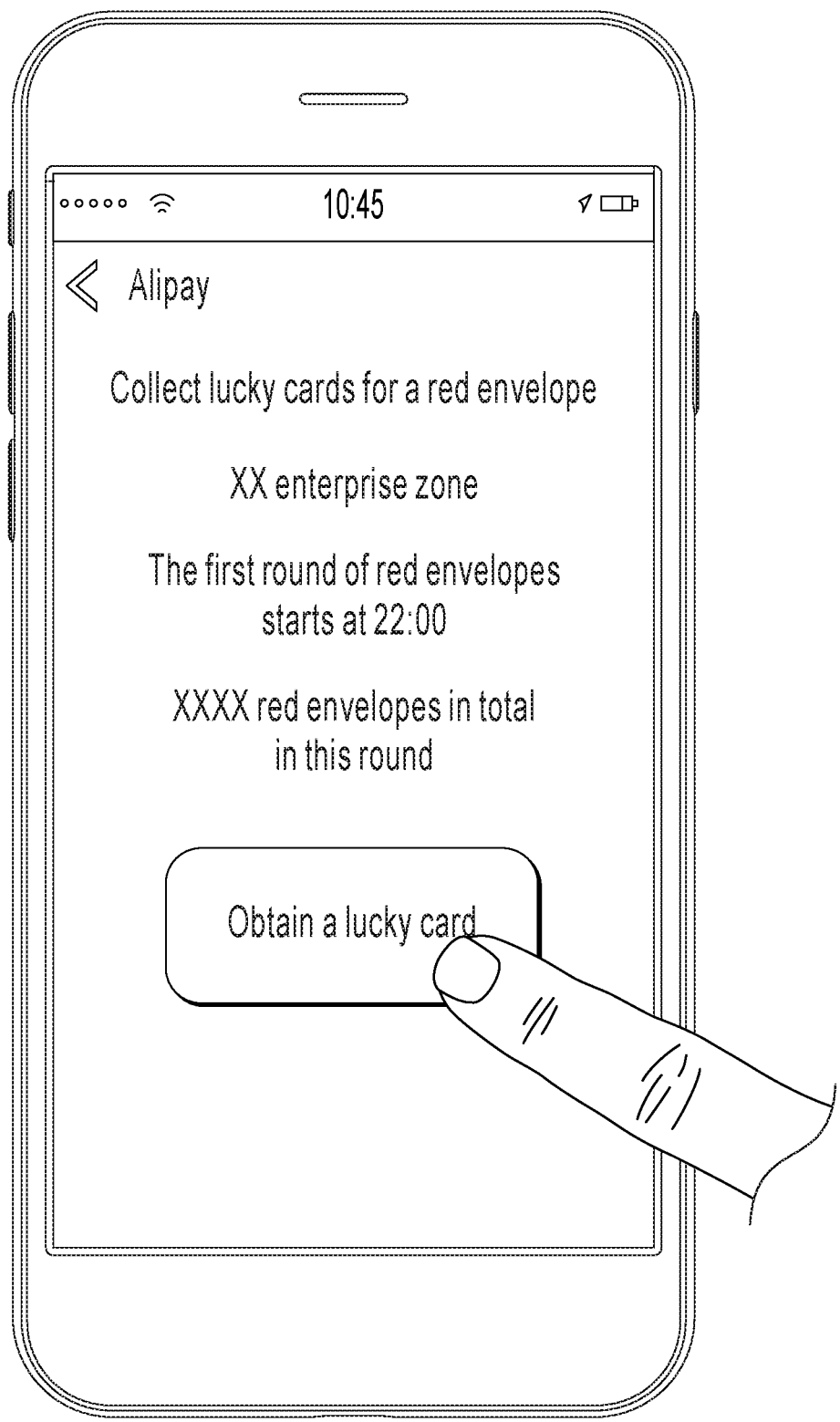
FIG. 2 through FIG. 6 are schematic diagrams illustrating a red envelope sending interface, according to an example implementation of the present application.

FIG. 2 through FIG. 6 are schematic diagrams illustrating a red envelope sending interface, according to an example implementation of the present application. Referring to FIG. 2, an activity entrance can be provided on a client software of the user. The activity entrance can be an activity interface of "Collect lucky cards and receive a red envelope". A trigger option of "Obtain a lucky card" can be provided in the activity interface. After the user triggers the option through a trigger operation such as a tap, the payment client software can initiate a request for collecting a virtual card to the payment platform. After receiving the request, the payment platform can actively deliver the virtual card to the user.

Among the five types of virtual cards, a certain number of types of "rare" virtual cards, for example, two types of "rare" virtual cards can be set on the payment platform. Whether to send the "rare" virtual cards depends on activeness of the user that is calculated by the payment platform based on user data. To be specific, the "rare" virtual cards can be preferentially sent to an active user. When delivering a virtual card to a common user, the payment platform can deliver two or three of the following five types of virtual cards to the user by default: "Health card", "Friendliness card", "Prosperity card", "Harmony card", and "Wealth card".

In this example, the user can obtain a virtual card shared by another user in addition to a virtual card actively delivered by the server.

When another user shares a virtual card, the another user can share the virtual card within the client software by using the same client software, or can share the virtual card in the form of a link or a picture by using a client software and the third-party social platform or an instant messaging client software.

In this example, when the client software of the user obtains the virtual card, the client software can generate a corresponding display picture for the virtual card, and display the display picture in the activity interface. Content in the display picture generated by the client software for different types of virtual cards is different from each other.

Figure 3:
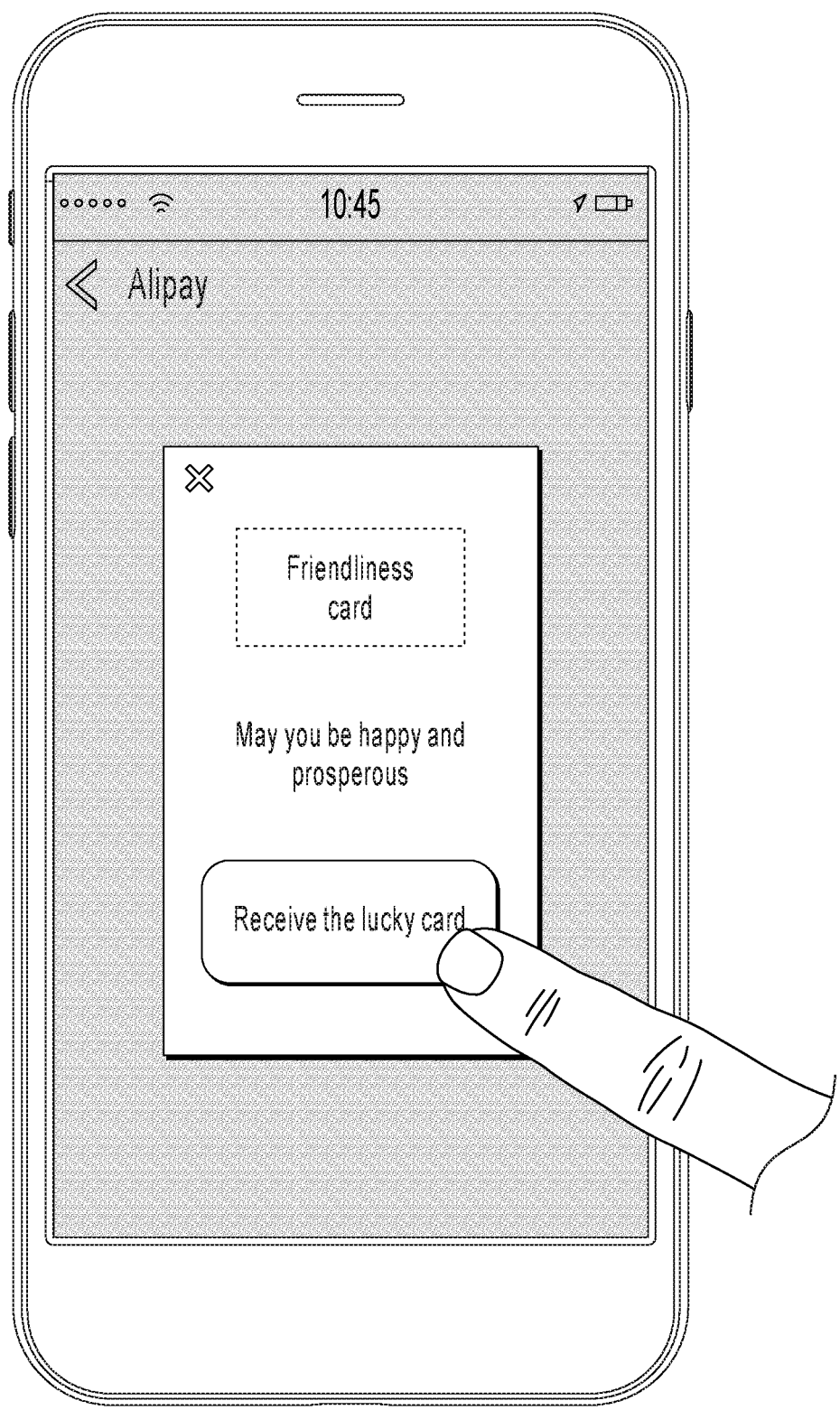

Referring to FIG. 3, when the display picture is displayed in the activity interface, a "Receive the lucky card" trigger option can be provided in the display picture. The user can trigger the option through a trigger operation such as a tap, to collect the virtual card, and then add the virtual card to a corresponding display location provided on the client software.

Display locations provided on the client software can be in a one-to-one mapping with types of virtual cards, and each type of virtual card can correspond to one display location.

Figure 4:
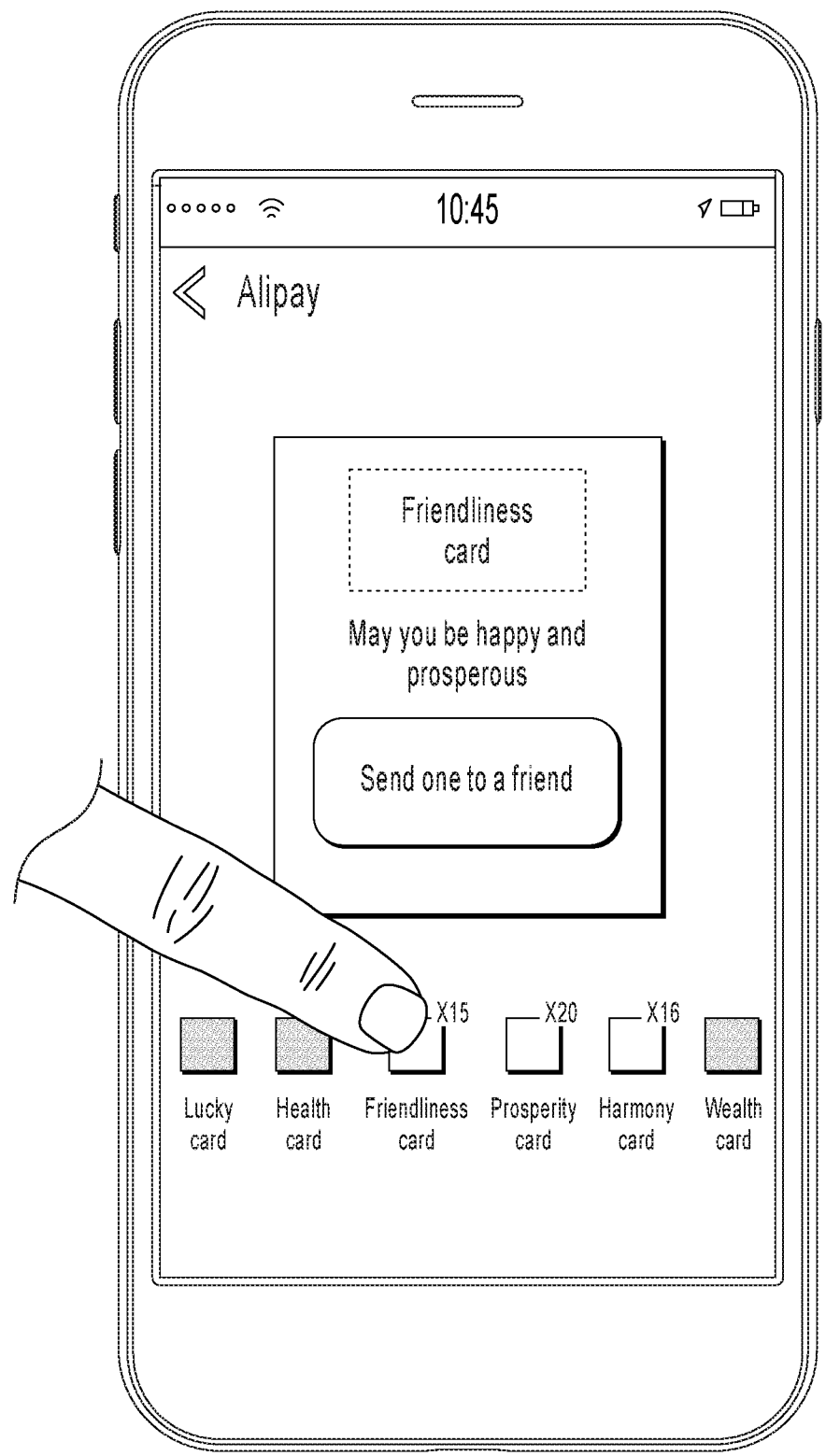

Referring to FIG. 4, one display location can be provided in the activity interface for each of the five types of virtual cards: "Health card", "Friendliness card", "Prosperity card", "Harmony card", and "Wealth card". After the client software adds the display picture to a corresponding display location, the client software can further mark the number of currently obtained virtual cards at a predetermined location (an upper right corner shown in FIG. 4) of the display location. In addition, when the number of virtual cards corresponding to the display location changes, the client software can further update the number.

Still referring to FIG. 4, in addition to the five display locations, a "Lucky card" display location can be further provided at a virtual card display location in the activity interface. If the user fails to collect the five types of virtual cards: "Health card", "Friendliness card", "Prosperity card", "Harmony card", and "Wealth card", the "Lucky card" display location can be set to grey, to notify the user that the user can not currently obtain "lucky card" red envelope receiving permission.

In this example, a virtual card displayed at a display location can be further shared by the user with another user.

Still referring to FIG. 4, when a user wants to share a type of virtual cards, the user can trigger a display location corresponding to the virtual card through a trigger operation such as a tap. After the display location is triggered, a display picture corresponding to the display location can be displayed in the user interface.

In this case, a trigger option of "Send one to a friend" can be further provided in the display picture. After the user triggers the trigger option through a trigger operation such as a tap, the client software can output a sharing method selection interface, and several sharing methods that can be selected by the first user can be provided in the selection interface. For example, the sharing method can include options such as "Send one to a friend through WeChat", "Send one to a friend through QQ", and "Send one to a friend through Dingtalk".

The user can select a sharing method in the selection interface. After the user selects the sharing method, the user can further specify a target user who the user wants to share the virtual card with from a friend list, and then the client software sends the virtual card to the target user in the form of a link or a picture.

The user has the "lucky card" red envelope receiving permission after the user obtains the virtual card delivered by the payment platform, and a virtual card shared by another friend to successfully collect the five types of virtual cards: "Health card", "Friendliness card", "Prosperity card", "Harmony card", and "Wealth card".

Figure 5:
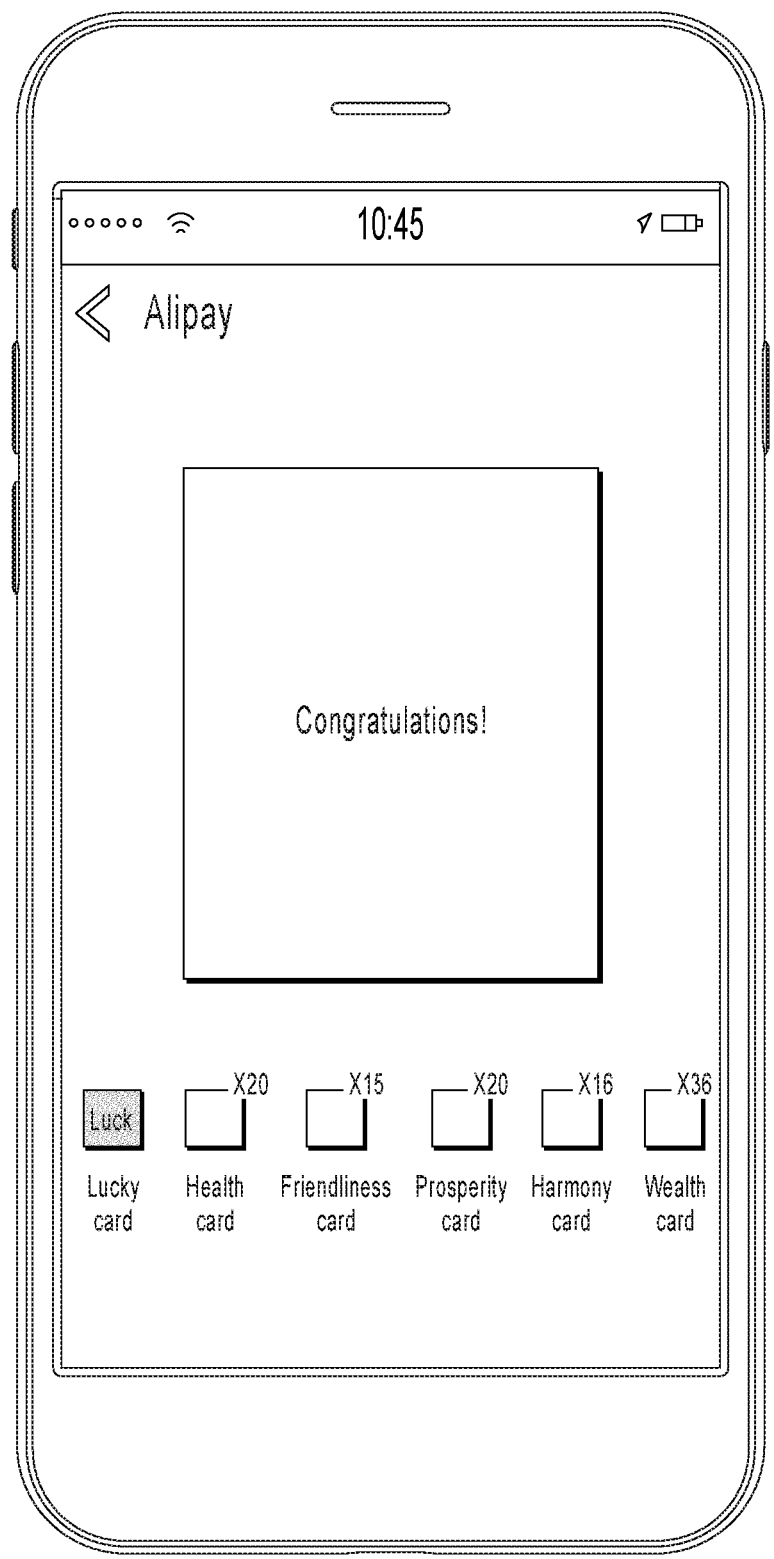

Referring to FIG. 5, after the user successfully collects the five types of virtual cards: "Health card", "Friendliness card", "Prosperity card", "Harmony card", and "Wealth card", the "Lucky card" display location can be prominently displayed, for example, highlighted, to notify the user that the user currently has the "lucky card" red envelope receiving permission.

After the user obtains the "lucky card" red envelope receiving permission, the user can manually trigger the "Lucky card" display location to trigger the client software to send a red envelope allocation request to the payment platform, or the client software automatically sends a red envelope allocation request to the payment platform. As such, the red envelope allocation request can include the collected five types of virtual cards. After receiving the request, the payment platform can perform verification on a type of the virtual card in the request. If the payment platform determines that the request includes the five types of virtual cards through verification, the payment platform can immediately send a "red envelope" with a certain amount to the user from an enterprise capital account of the cooperative enterprise, or send a "red envelope" with a certain amount to the user when a sending time arrives. For example, the payment platform can count the number of all users who obtain the "lucky card" red envelope receiving permission, and then equally allocate a red envelope amount that can be sent from the enterprise capital account.

After the user receives a "red envelope", the payment platform can push a red envelope sending result to the client software. After receiving the sending result, the client software can display the sending result to the user in the activity interface.

Figure 6:
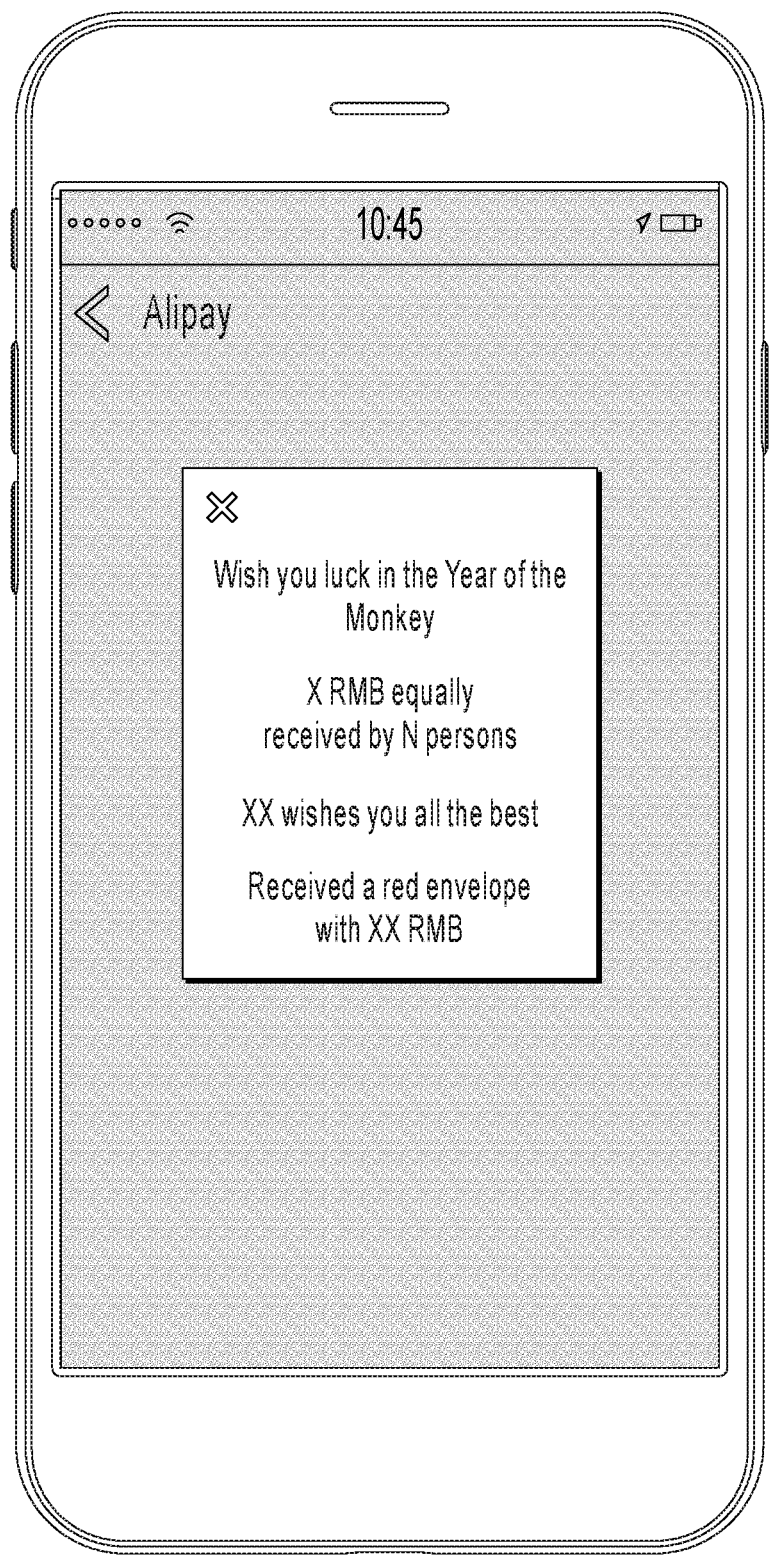
Figure 7:
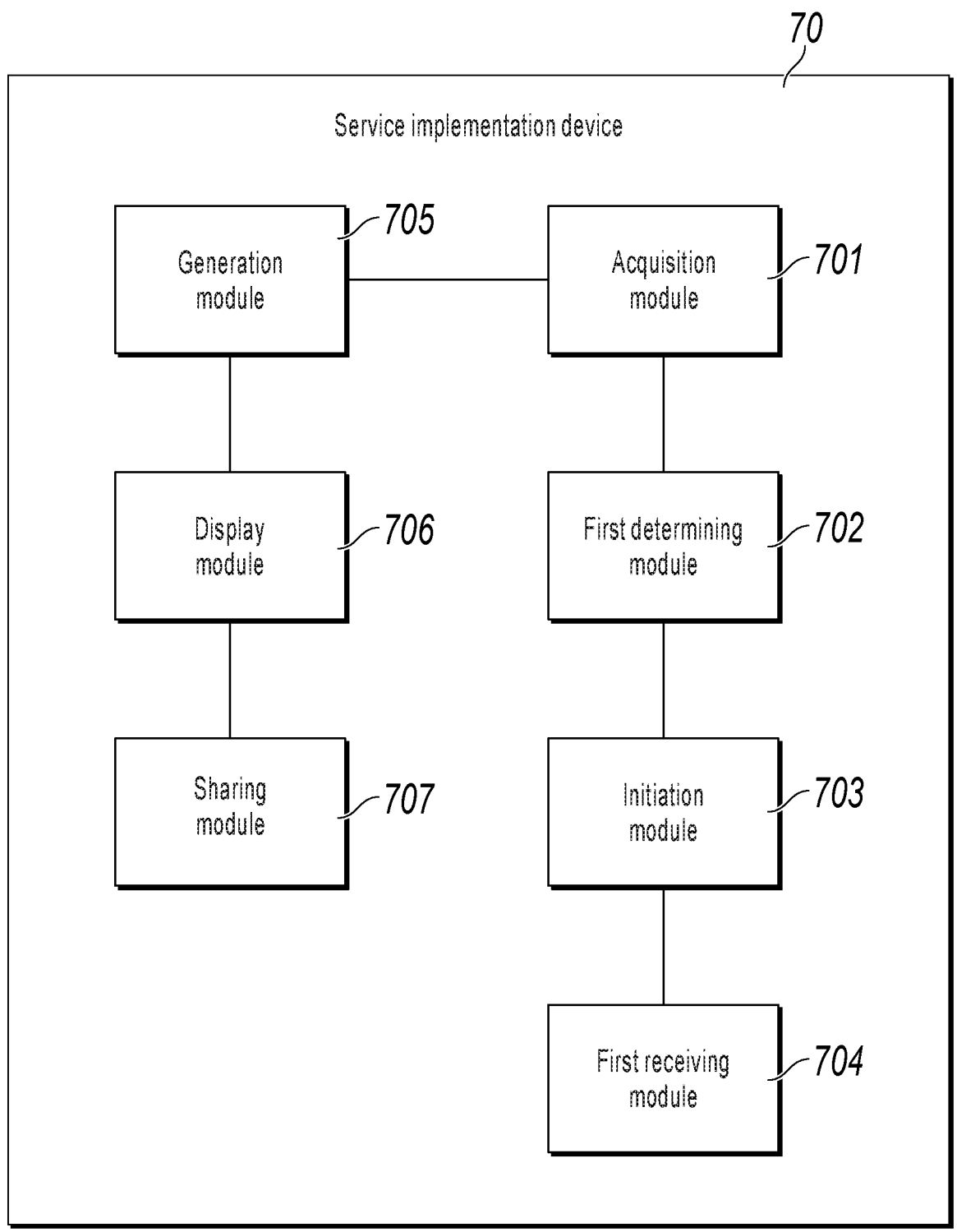
FIG. 7 is a block diagram illustrating a service implementation device, according to an example implementation of the present application.

Referring to FIG. 6, information displayed in the red envelope sending result can include an amount received this time, a red envelope sender (a name of an enterprise that cooperates with the payment platform), a current total number of persons receiving a "lucky card" red envelope, an allocation rule (an allocation rule shown in FIG. 7 is equal allocation) of the "lucky card" red envelope, etc.

It can be seen that when the technical solutions shown in FIG. 1 are applied to a red envelope sending application scenario, the user can obtain the red envelope receiving permission by collecting a certain number of electronic credentials. Therefore, red envelope sending becomes more interesting, and user experience is improved.

Corresponding to the method implementation, the present application further provides a device implementation.

Figure 8:
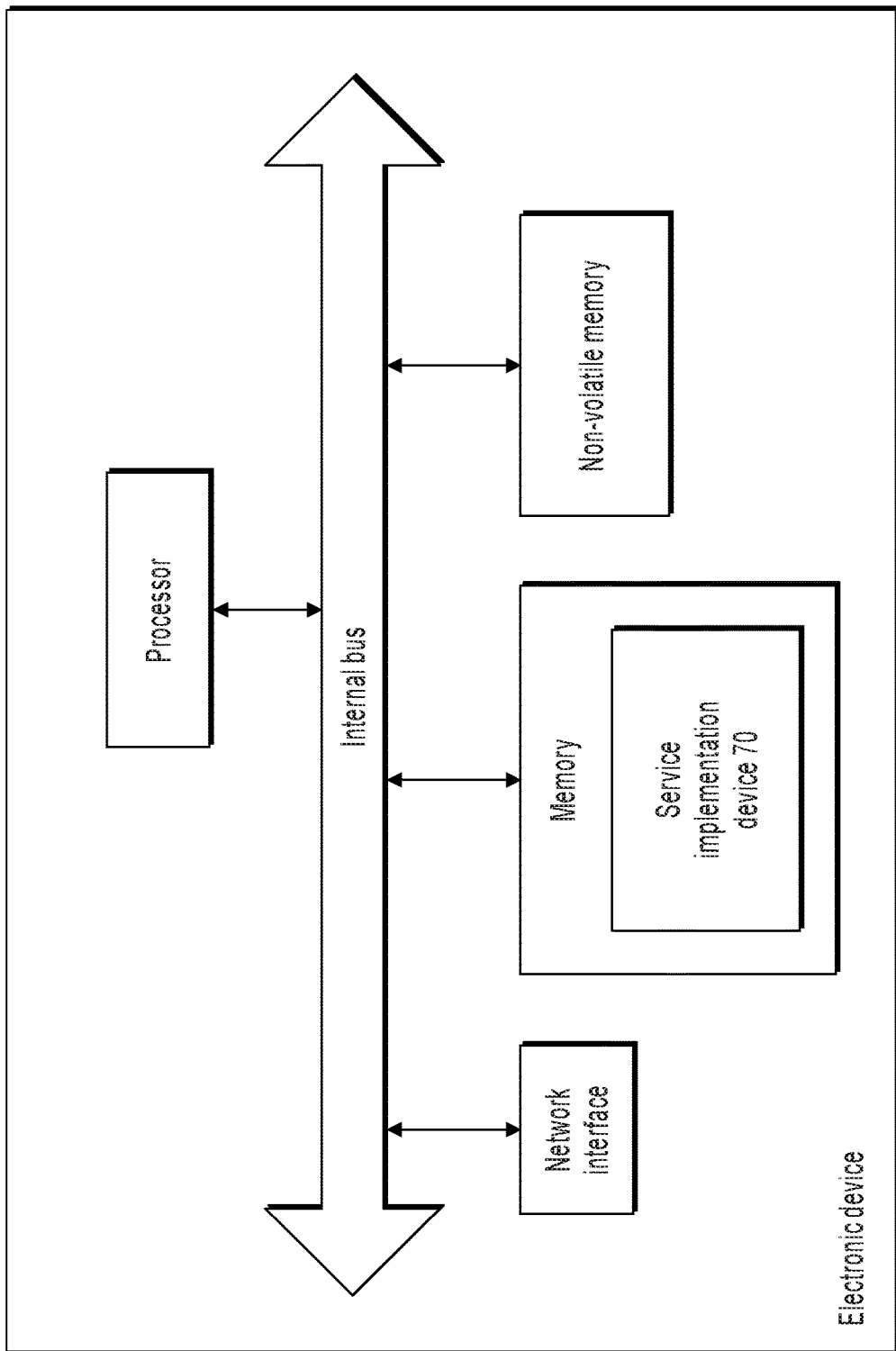
FIG. 8 is a schematic structural diagram illustrating an electronic device, according to an example implementation of the present application.

Referring to FIG. 7, the present application provides a service implementation device 70 applied to an electronic device. Referring to FIG. 8, a hardware architecture of a terminal that includes the service implementation device 70 usually includes a CPU, a memory, a non-volatile memory, a network interface, an internal bus, etc. For example, in software implementation, the service implementation device 70 can usually be understood as a logical device that combines software and hardware after a computer program loaded in the memory runs in the CPU. The device 70 includes: an acquisition module 701, configured to obtain an electronic credential used to extract a service object; a first determining module 702, configured to determine whether a category number of obtained electronic credentials reaches a first number; and an initiation module 703, configured to: when the category number of obtained electronic credentials reaches the first number, initiate an object allocation request including several electronic credentials whose category number is the first number to a server, so that the server allocates a service object to a first user from a service object set based on the object allocation request.

In this example, the acquisition module 701 is configured to: obtain an electronic credential delivered by the server to the first client software; and obtain an electronic credential shared by a second user by using a second client software.

In this example, the first client software provides a trigger option used to obtain an electronic credential.

The acquisition module 701 is further configured to: when a trigger operation of the first user on the trigger option is detected, initiate a request for collecting the electronic credential to the server, so that the server delivers the electronic credential to the first client software based on a predetermined delivery rule; and obtain the electronic credential delivered by the server to the first client software based on the predetermined delivery rule, where a category number of electronic credentials delivered by the server to the first client software is smaller than the first number.

In this example, the device 70 further includes: a generation module 704, configured to generate a corresponding display picture for the electronic credential when the electronic credential is obtained; and a display module 705, configured to add the generated display picture to a display location corresponding to the electronic credential, where display pictures generated for different categories of electronic credentials are different from each other, and display locations corresponding to different categories of electronic credentials are different from each other.

In this example, the generation module 704 is further configured to: mark the number of obtained electronic credentials at the display location; and update the number based on an actual number of remaining electronic credentials.

In this example, the device 70 further includes: a sharing module 706, configured to: when a predetermined trigger operation of the first user on a display picture added to any display location is detected, share an electronic credential corresponding to the display picture with a target user selected by the first user.

In this example, the device 70 further includes: a first receiving module 707, configured to: when the server has allocated the service object to the first user, receive an allocation result sent by the server, and display the allocation result to the first user.

The allocation result includes one or more of the following information: the number of service objects, a sender of the service object, the number of other receivers of the service object, and an allocation rule of the service object.

Figure 9:
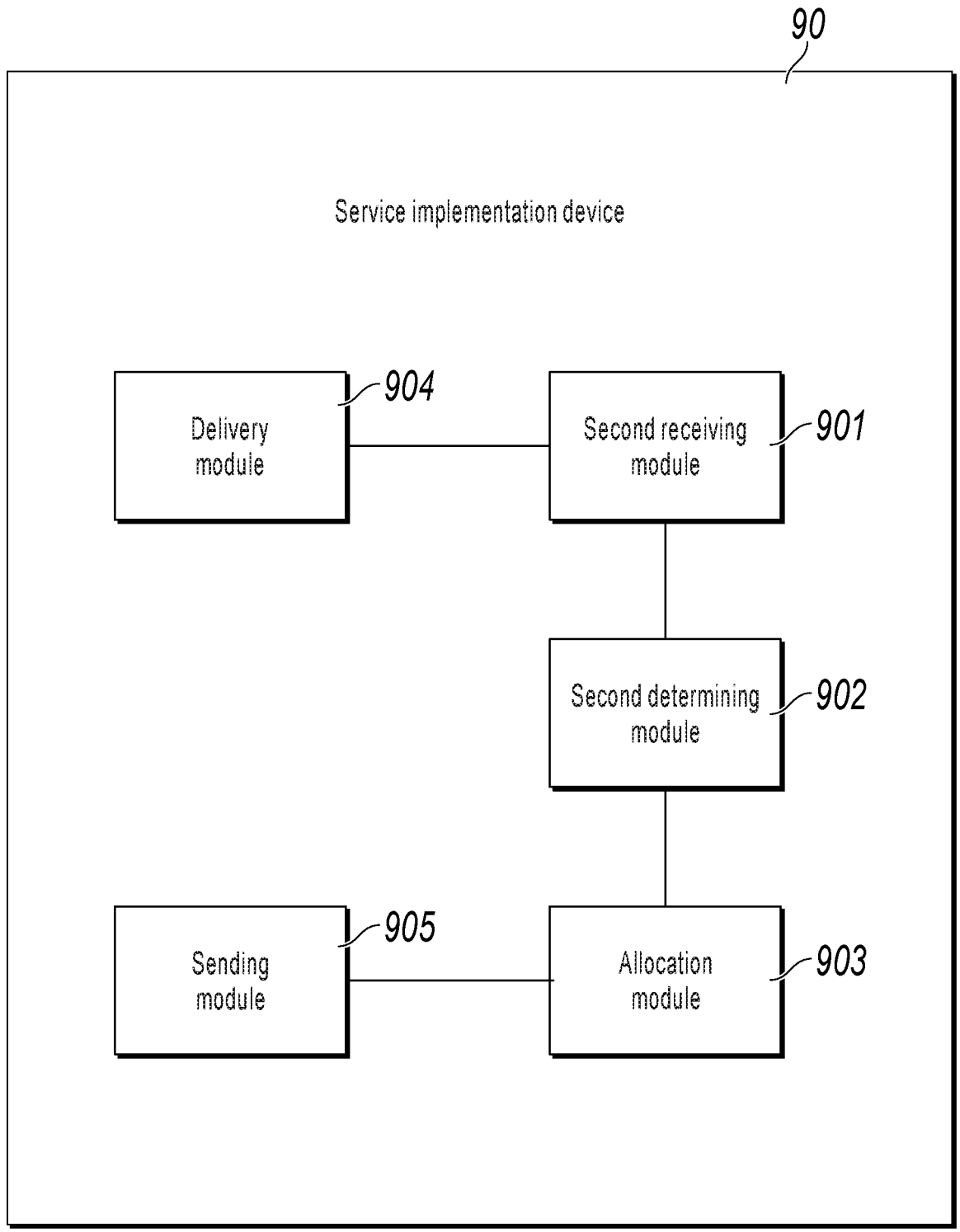
FIG. 9 is a block diagram illustrating another service implementation device, according to an example implementation of the present application.
Figure 10:
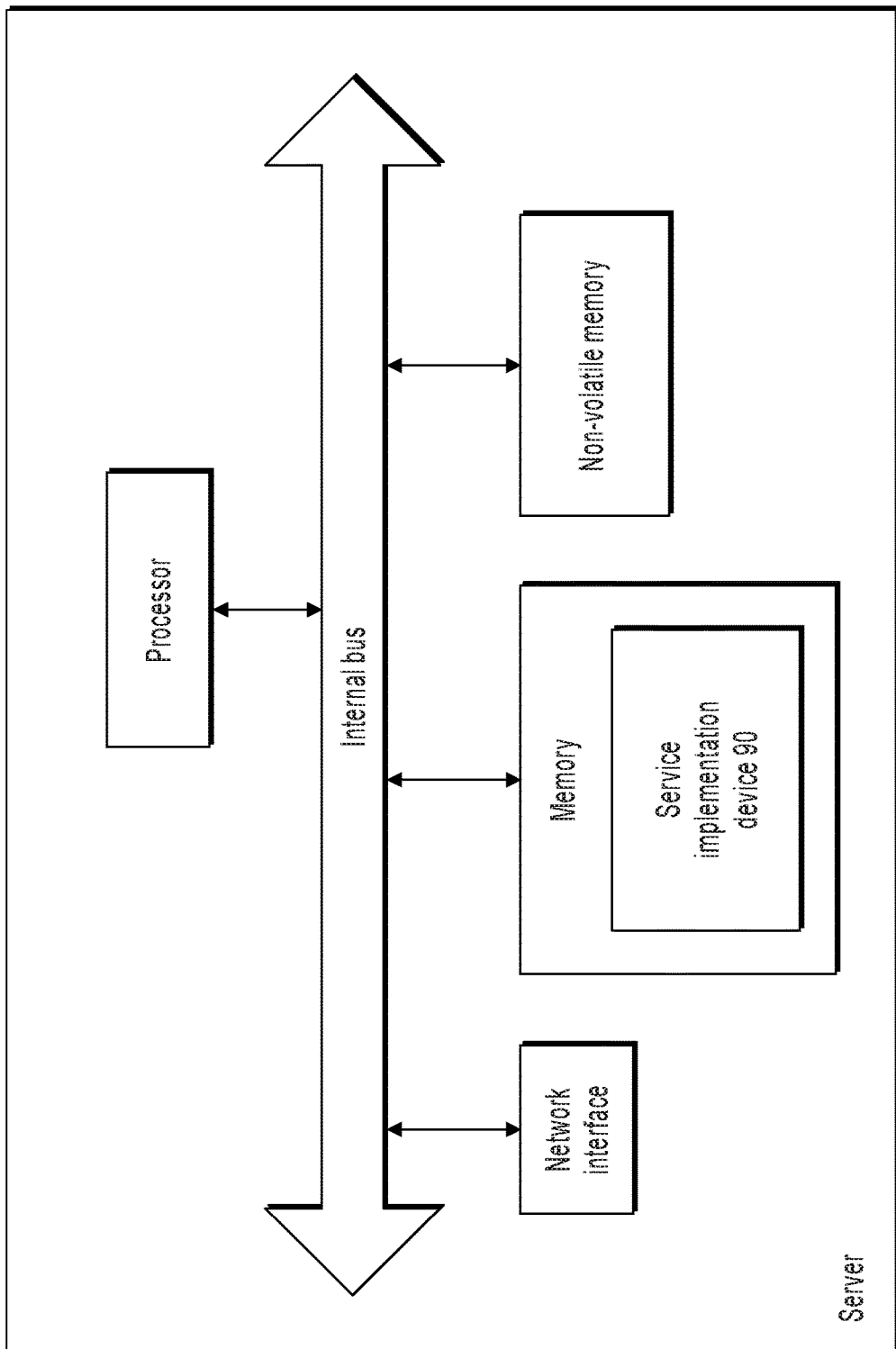
FIG. 10 is a schematic structural diagram illustrating a server, according to an example implementation of the present application.

Referring to FIG. 9, the present application provides a service implementation device 90 applied to a server. Referring to FIG. 10, a hardware architecture of a server that includes the service implementation device 90 usually includes a CPU, a memory, a non-volatile memory, a network interface, an internal bus, etc. For example, in software implementation, the service implementation device 90 can usually be understood as a logical device that combines software and hardware after a computer program loaded in the memory runs in the CPU. The device 90 includes: a second receiving module 901, configured to receive an object allocation request sent by a first user by using a first client software, where the object allocation request includes several electronic credentials used to extract a service object; a second determining module 902, configured to determine whether a category number of electronic credentials included in the object allocation request reaches a first number; and an allocation module 903, configured to: when the category number of electronic credentials included in the object allocation request reaches the first number, allocate a service object to the first user from a service object set based on a predetermined allocation rule.

In this example, the device 90 further includes: a delivery module 904, configured to: when a request sent by the first client software to obtain the electronic credential is received, deliver the electronic credential to the first client software from locally stored electronic credentials based on a predetermined delivery rule. A category number of electronic credentials delivered to the first client software is smaller than the first number.

In this example, the delivery module 904 is configured to: randomly deliver the electronic credential to the first client software from the locally stored electronic credentials.

In this example, the locally stored electronic credentials are pre-divided into at least a low-frequency delivery set and a high-frequency delivery set; and the delivery module 904 is configured to: calculate activeness of the first user; determine whether the activeness reaches a predetermined threshold; and when the activeness reaches the predetermined threshold, deliver the electronic credential to the first client software from the low-frequency delivery set; or deliver electronic credentials to the first client software from the low-frequency delivery set and the high-frequency delivery set, where the delivered electronic credentials include at least one electronic credential in the low-frequency delivery set.

In this example, the device 90 further includes: a sending module 905, configured to: when the service object has been allocated to the first user, send an allocation result to the first client software, so that the first client software displays the allocation result to the first user.

The allocation result includes one or more of the following information: the number of service objects, a sender of the service object, the number of other receivers of the service object, and an allocation rule of the service object.

The previous descriptions are merely example implementations of the present application, but are not intended to limit the present application. Any modification, equivalent replacement, or improvement made without departing from the spirit and principle of the present application should fall within the protection scope of the present application.

Figure 11:
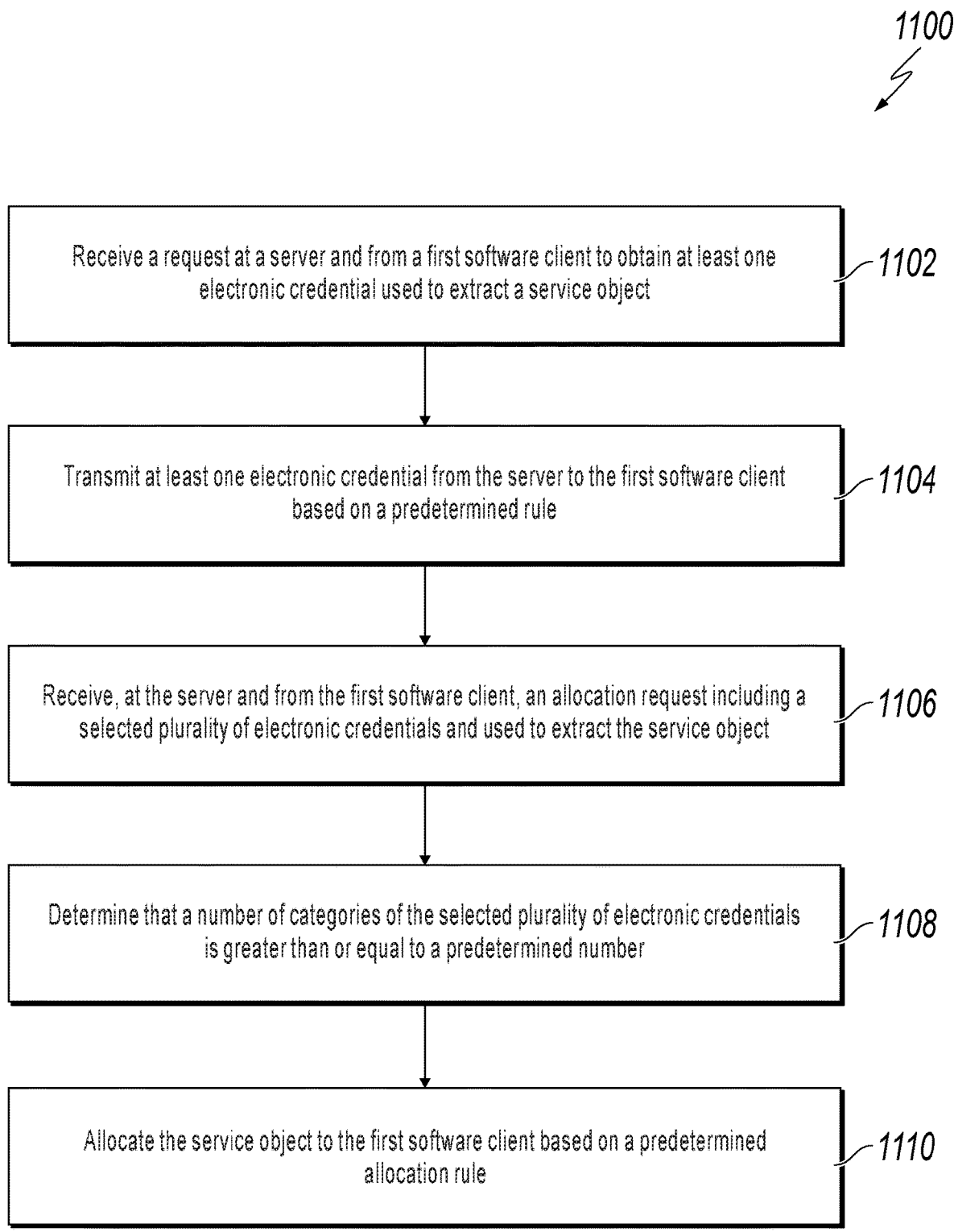
FIG. 11 is a flowchart illustrating an example of a computer-implemented method for allocating a service object, according to an implementation of the present disclosure.

FIG. 11 is a flowchart illustrating an example of a computer-implemented method 1100 for allocating a service object, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order.

At 1102, a request to obtain at least one electronic credential is received at a server and from a first software client (for example, the previously described first client software executing on a mobile computing device). The first software client is associated with a first user, and the server stores a plurality of electronic credentials. The electronic credential is used to extract a service object.

In some implementations, the software client can be client software that includes an application program installed on an electronic device. For example, in a "red envelope" sending application scenario, the software client can include client software installed on the electronic device to provide a red envelope sending function, for example, Alipay. The service object can be service interaction data in any form. In an example implementation, the service object can include virtual goods, for example, a coupon, an E-card, or a fund. The virtual goods can include different content in different services. For example, the service object can be money in a payment service; or the service object can be a coupon in a commodity activity service initiated by a merchant. The electronic credential is a credential used when the first user extracts the service object from the server. Each electronic credential can have a corresponding category or type. Each category of electronic credentials can represent one type of credential, and each type of credential can have the same or different content.

In some implementations, the first user can collect the electronic credential by using the first software client, and obtain service object allocation permission when the category number of collected electronic credentials reaches a predetermined number (for example, the previously described first number). The category number is the number of types of electronic credentials collected by the user.

In some implementations, the electronic credentials collected at the first software client include electronic credentials received from the server and from a second software client (for example, the previously described second client software) associated with a second user. In this example, the first user can obtain, by using the first software client, an electronic credential shared by the second user using a second software client. The second user can be another user with respect to the first user. The second software client can be the same as the first software client. When the second user shares the electronic credential with the first user by using the second software client, the second user can share the electronic credential within the second software client, or can forward the electronic credential to a third-party software client, and can then share the electronic credential with the first user.

In some implementations, not only can the first user actively obtain the electronic credential from the server by triggering a trigger option provided by the first software client, but the server can also actively deliver the electronic credential.

At 1104, at least one electronic credential is transmitted to the first software client from the server based on a predetermined rule. In some implementations, the predetermined rule is that a category number of electronic credentials delivered to the first software client from the server is smaller than a predetermined number. The category number is the number of types of electronic credentials collected by the user. In other words, the number of types of electronic credentials delivered by the server to the first software client is smaller than the predetermined number.

In some implementations, delivering the electronic credentials to the first software client based on a predetermined rule include randomly delivering the electronic credentials to the first client software from the server.

In some implementations, delivering the electronic credentials to the first software client based on a predetermined rule include selective delivery to a specific group. That is, the server can pre-divide the plurality of electronic credentials stored on the server into at least a low-frequency delivery set and a high-frequency delivery se. An electronic credential in the low-frequency delivery set can be delivered to a specific user designated by the server, and an electronic credential in the high-frequency delivery set can be delivered to a common user.

In some implementations, when determining that the first user is an active user, the server can read the electronic credential only from the low-frequency delivery set, and deliver the electronic credential to the first user.

In some implementations, when determining that first users are an active group, the server can read electronic credentials from both the low-frequency delivery set and the high-frequency delivery set, and deliver the electronic credentials to the first users. However, in this case, the delivered electronic credentials need to include at least one electronic credential in the low-frequency delivery set. The server can deliver the electronic credential to an inactive common user only from the high-frequency delivery set. As such, the active user can obtain a relatively "rare" electronic credential more easily, so that the active user can more easily obtain service object acquisition permission At 1106, an allocation request to extract a service object is received at the server and from the first software client. The allocation request includes a plurality of electronic credentials that are selected from electronic credentials collected at the first software client.

In some implementations, the allocation request is delivered to the server after the first software client determines a category number of the collected electronic credential reaches a predetermined number. It is worthwhile to note that an operation of initiating the object allocation request by the first software client to the server can be manually triggered by the user, or can be automatically triggered when the first software client determines that the category number of collected electronic credentials reaches the predetermined number.

At 1108, a determination is made at the server that a number of categories of the selected plurality of electronic credentials included in the allocation request is greater than or equal to a predetermined number.

In some implementations, after the server verifies the electronic credentials included in the object allocation request, if the server determines that the number of categories of electronic credentials included in the object allocation request is greater than or equal to the predetermined number, the server can grant the service object allocation permission to the first user, and immediately allocate the service object to the first user from a corresponding service object set (that is, a set of service objects that can be extracted by the first user) based on a particular predetermined allocation rule. In some implementations, the particular predetermined allocation rule can include allocating the service object once an allocation time specified after which to allocate the service object is satisfied.

At 1110, the service object is allocated to the first software client based on a predetermined allocation rule and is selected from a service object set. For example, when the service object is money sent in a red envelope format, the service object set can be a red envelope sending account of a third-party enterprise that cooperates with a red envelope sending platform.

In some implementations, the predetermined allocation rule can be predetermined based on an actual service requirement. For example, the server can perform a count of a number of users who are granted object allocation permission, and calculate an average allocation number of service objects in a service object set based on the performed count. In this case, the calculated average allocation number can be a number of service objects that need to be allocated to each user, and the server can allocate a service object to each user from the service object set based on the calculated average allocation number.

In some implementations, when allocating the service object to the first user, the server can randomly extract a certain number of service objects from the service object set for the first user. For example, the server can calculate a random number for the first user based on a predetermined random algorithm with reference to a total number of service objects in the service object set, and then allocate the service object to the first user based on the calculated random number. After 1110, method 1100 stops.

Implementations of the subject matter described in this specification can be implemented so as to realize particular advantages or technical effects. For example, implementations of the subject matter permit transactions of electronic credentials between individual client devices and the server, and among different client devices in a secure and efficient manner. The server receives a request for collecting electronic credentials from a software client and delivers corresponding electronic credentials to the requesting software client. The software client also can request and receive electronic credentials from other trusted software clients. Once enough electronic credentials are collected that meet a predetermined criteria, the software client can send another allocation request to the server to request a service object, for example, a "red package." The server verifies the electronic credentials contained in the allocation request and sends the service object accordingly. By allowing the user to send the request and receive the requested electronic credentials only from a specific application (for example, Alipay, a trusted computing device, or other application authorized by the server), efficiency of an exchange of the requested electronic credentials is improved, and forgery of the requested electronic credentials or leakage of the user privacy data can be mitigated or prevented.

The described methodology permits enhancement of transaction/data security and efficiency of various computing devices and applications installed on such computing devices. Participants in transactions using authorized software installed on their computing devices can be confident that a transaction involving the requested electronic credentials and the service object is secure, and that private data/information will not be leaked to unauthorized parties.

The described methodology can ensure the efficient usage of computer resources (for example, processing cycles, network bandwidth, and memory usage), through efficient centralized server processing. At least these actions can minimize or prevent waste of available computer and network resources with respect to multiple parties in transactions by reducing bandwidth usage between mobile computing devices and the server, and among the computing devices. Instead of requesting electronic credentials repeatedly to collect needed electronic credentials, users can request and exchange a particular needed electronic credential from and with, respectively, other trusted users. Therefore, a needed electronic credential can be more quickly and securely obtained to improve user experience.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   receiving, at a server and from a first software client, a request to obtain at least one electronic credential, wherein the first software client is associated with a first user, wherein the server stores a plurality of electronic credentials,
      wherein the plurality of electronic credentials stored at the server are divided into a plurality of types of electronic credential, and wherein the plurality of types of electronic credential are divided into a rare set of types of electronic credential and a common set of types of electronic credential;
   determining an activeness of the first user, the activeness based on a social connectivity of the first user in a software application;
   determining that the activeness of the first user is greater than or equal to a predetermined threshold;
   in response to determining that the activeness of the first user is greater than or equal to the predetermined threshold, transmitting, from the server, an electronic credential having a type in the rare set of types to the first software client based on a predetermined rule;
   receiving, at the server and from the first software client, an allocation request to extract a service object, wherein the allocation request comprises a second plurality of electronic credentials selected from electronic credentials obtained by the first software client;
   determining, at the server, that a number of types of electronic credential included in the second plurality of electronic credentials is greater than or equal to a predetermined number; and
   allocating the service object to the first software client based on a predetermined allocation rule, wherein the service object is selected from a service object set.

2. The computer-implemented method of claim 1, wherein the electronic credentials obtained by the first software client comprise electronic credentials received from the server and from a second software client associated with a second user.

3. The computer-implemented method of claim 1, wherein the allocation request is transmitted to the server by the first software client after the first software client determines that a number of types of electronic credential collected by the first software client is greater than or equal to the predetermined number.

4. The computer-implemented method of claim 1, wherein the predetermined rule is that a number of types of electronic credential delivered to the first software client from the server is smaller than the predetermined number.

5. The computer-implemented method of claim 1, wherein transmitting the at least one electronic credential to the first software client comprises randomly delivering the electronic credentials to the first software client.

6. The computer-implemented method of claim 1, wherein, when allocating the service object to the first software client, an allocation result is sent to the first software client for display on a computer display, wherein the allocation result comprises one or more of a number of service objects, a sender of the service object, a number of other receivers of the service object, and an allocation rule of the service object.

7. The computer-implemented method of claim 1, wherein the social connectivity of the first user is based on a number of friends of the first user in the software application.

8. A non-transitory, computer-readable medium storing one or more instructions executable by a computer system to perform operations comprising:
receiving, at a server and from a first software client, a request to obtain at least one electronic credential, wherein the first software client is associated with a first user, wherein the server stores a plurality of electronic credentials,
wherein the plurality of electronic credentials stored at the server are divided into a plurality of types of electronic credential, and wherein the plurality of types of electronic credential are divided into a rare set of types of electronic credential and a common set of types of electronic credential;
determining an activeness of the first user, the activeness based on a social connectivity of the first user in a software application;
determining that the activeness of the first user is greater than or equal to a predetermined threshold;
in response to determining that the activeness of the first user is greater than or equal to the predetermined threshold, transmitting, from the server, an electronic credential having a type in the rare set of types to the first software client based on a predetermined rule;
receiving, at the server and from the first software client, an allocation request to extract a service object, wherein the allocation request comprises a second plurality of electronic credentials selected from electronic credentials obtained by the first software client;
determining, at the server, that a number of types of electronic credential included in the second plurality of electronic credentials is greater than or equal to a predetermined number; and
allocating the service object to the first software client based on a predetermined allocation rule, wherein the service object is selected from a service object set.

9. The non-transitory, computer-readable medium of claim 8, wherein the electronic credentials obtained by the first software client comprise electronic credentials received from the server and from a second software client associated with a second user.

10. The non-transitory, computer-readable medium of claim 8, wherein the allocation request is transmitted to the server by the first software client after the first software client determines that a number of types of electronic credential collected by the first software client is greater than or equal to the predetermined number.

11. The non-transitory, computer-readable medium of claim 8, wherein the predetermined rule is that a number of types of electronic credential delivered to the first software client from the server is smaller than the predetermined number.

12. The non-transitory, computer-readable medium of claim 8, wherein transmitting the at least one electronic credential to the first software client comprises randomly delivering the electronic credentials to the first software client.

13. The non-transitory, computer-readable medium of claim 8, wherein, when allocating the service object to the first software client, an allocation result is sent to the first software client for display on a computer display, wherein the allocation result comprises one or more of a number of service objects, a sender of the service object, a number of other receivers of the service object, and an allocation rule of the service object.

14. The computer-readable medium of claim 8, wherein the social connectivity of the first user is based on a number of friends of the first user in the software application.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, at a server and from a first software client, a request to obtain at least one electronic credential, wherein the first software client is associated with a first user, wherein the server stores a plurality of electronic credentials,
wherein the plurality of electronic credentials stored at the server are divided into a plurality of types of electronic credential, and wherein the plurality of types of electronic credential are divided into a rare set of types of electronic credential and a common set of types of electronic credential;
determining an activeness of the first user, the activeness based on a social connectivity of the first user in a software application;
determining that the activeness of the first user is greater than or equal to a predetermined threshold;
in response to determining that the activeness of the first user is greater than or equal to the predetermined threshold, transmitting, from the server, an electronic credential having a type in the rare set of types to the first software client based on a predetermined rule;
receiving, at the server and from the first software client, an allocation request to extract a service object, wherein the allocation request comprises a second plurality of electronic credentials selected from electronic credentials obtained by the first software client;
determining, at the server, that a number of types of electronic credential included in the second plurality of electronic credentials is greater than or equal to a predetermined number; and
allocating the service object to the first software client based on a predetermined allocation rule, wherein the service object is selected from a service object set.

16. The computer-implemented system of claim 15, wherein the electronic credentials obtained by the first software client comprise electronic credentials received from the server and from a second software client associated with a second user.

17. The computer-implemented system of claim 15, wherein the allocation request is transmitted to the server by the first software client after the first software client determines that a number of types of electronic credential collected by the first software client is greater than or equal to the predetermined number.

18. The computer-implemented system of claim 15, wherein the predetermined rule is that a number of types of electronic credential delivered to the first software client from the server is smaller than the predetermined number.

19. The computer-implemented system of claim 15, wherein transmitting the at least one electronic credential to the first software client comprises randomly delivering the electronic credentials to the first software client.

20. The computer-implemented system of claim 15, wherein the social connectivity of the first user is based on a number of friends of the first user in the software application.

* * * * *